United States Patent [19]

Ames

[11] 4,026,042
[45] May 31, 1977

[54] COLOR TOY DEVICE

[76] Inventor: Alvin G. Ames, P.O. Box 3500, San Diego, Calif. 92103

[22] Filed: Dec. 22, 1975

[21] Appl. No.: 642,893

[52] U.S. Cl. .................................. 35/28.3; 35/77; 46/49

[51] Int. Cl.² .......................................... G09B 1/02

[58] Field of Search ................. 35/28.3, 28.5, 77; 40/77.8; 46/47, 49; 273/143 R

[56] References Cited

UNITED STATES PATENTS

| | | | |
|---|---|---|---|
| 488,625 | 12/1892 | Clark | 35/77 X |
| 537,887 | 4/1895 | Bradley | 46/49 |
| 838,305 | 12/1906 | Curial | 46/49 |
| 853,756 | 5/1907 | Betis | 35/77 X |
| 894,654 | 7/1908 | Ives | 46/49 X |
| 1,600,609 | 9/1926 | Wendler | 46/49 |
| 2,631,405 | 3/1953 | Masten | 46/49 |
| 2,779,129 | 1/1957 | Reyher | 46/49 |
| 2,794,644 | 6/1957 | Johnson | 273/143 R |
| 3,184,864 | 5/1965 | Johnson | 35/28.3 |
| 3,278,182 | 10/1966 | Lescher | 46/49 X |
| 3,809,785 | 5/1974 | Calabrese | 35/28.3 |

FOREIGN PATENTS OR APPLICATIONS 433,175  8/1935  United Kingdom ............. 40/77.8

Primary Examiner—Harland S. Skogquist

[57] ABSTRACT

A color toy device with an elongated base having an upright wall at each end thereof:
a shaft extending through said walls, spanning the space therebetween, and having a crank at one end exterior to the wall at that end, whereby the shaft can be rotated manually;
a plurality of cylindrical wheels, each wheel having alternating axially extending stripes of different colors, on the curved surfaces thereof;
said wheels each having a centered hole and the wheels being coaxially mounted, in side by side relation, for free individual rotation on said shaft between said upright walls;
whereby the wheels may be individually spun by the finger of a user of the device to give the visual impression of a single solid color or each wheel, or all the wheels may be spun together by rapidly turning said crank to produce a multihued panorama of solid colors.

1 Claim, 7 Drawing Figures

U.S. Patent
May 31, 1977
4,026,042
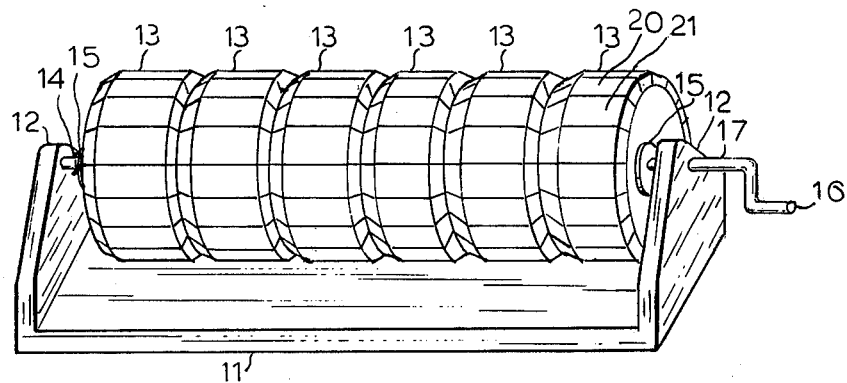
FIG. 1
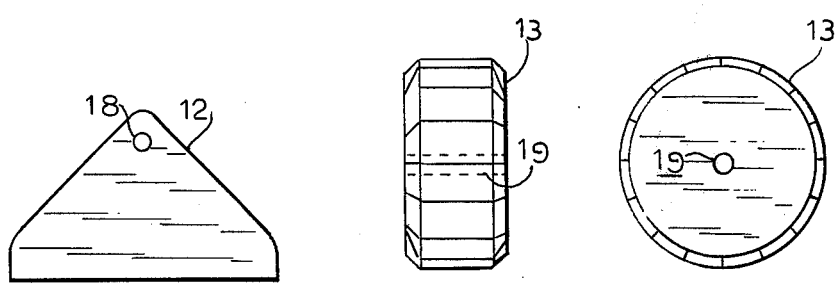
FIG. 2    FIG. 3    FIG. 4
  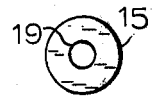
FIG. 5   FIG. 6   FIG. 7

COLOR TOY DEVICE

DESCRIPTION OF THE INVENTION

This invention relates to a color toy device having an elongated base. Both narrow ends have identical vertical sidewalls with a hole near the top for insertion of a transverse rod, the purpose of which is to hold and suspend an indefinite number of wheels (ten, more of fewer), each wheel having a centered hole permitting suspension on said rod, the hole being slightly larger in diameter than the rod to permit free spinning of any or all wheels on the rod or axis. Each wheel has two or more alternating stripes of different colors, affixed in a precise, continuous order. A crank—either an extension of the transverse rod or otherwise attached to the rod—permits spinning of all wheels at the same time.

DETAILED DESCRIPTION OF DRAWINGS

FIG. 1 affords a perspective view of the color toy device, showing all parts. Item 11 is an elongated base, with suggested dimensions of 3 by 6 inches, whose purpose is to support, and to which are affixed, two identical sidewalls identified as Items 12. Item 13 identifies six wheels of identical shape and size. Item 17 is a transverse rod 7/32 inch in diameter. Item 16 identifies a double bend of a protruding part of the transverse rod, serving as a crank. Item 20 points out one of a number of approximately ¼ inch white stripes alternating with Item 21 which identifies one of a number of approximately ¼ inch alternating black stripes. Color detail is given under OPERATION.

FIG. 2 is one of two identical sidewalls, identified in FIG. 1 as Item 12. Item 18 is a hole 15/64 inch in diameter located approximately 1½ inches above the center of the base to which it is affixed.

FIG. 3 is a front view of one of the wheels, identified in FIG. 1 as Item 13. The wheel is approximately ¾ inch in width. Item 19 shows the location of the centered hole.

FIG. 4 is a side view of one of the wheels, identified in FIG. 1 as Item 13. Item 19 shows the location of the centered hole, 15/64 inch in diameter.

FIG. 5 is a lock pin. Its position is shown in FIG. 1, Item 14. The purpose of the pin is to prevent separation of the assembled parts.

FIG. 6 is a side view of one of two optional washers, identified as Item 15 in FIG. 1.

FIG. 7 is a front view of one of the two optional washers. Item 19 is a hole in the washer, preferably 15/64 inch in diameter.

OPERATION

The color toy device is designed so that one wheel can be spun by a flip with a fingertip. By cranking the transverse rod at an accelerating pace all wheels, as a result of friction, will gradually spin swiftly.

When a wheel is given a spin with fingertip, the naked eye loses the identity of the two- or multi-colored horizontal stripes. The eye appears to see, instead, a new solid color. When the transverse rod is cranked, all wheels will rotate swiftly because of friction which is induced by close tolerance in the diameter of the transverse rod and the hole in each suspended wheel. Thus, all wheels appear to be painted in solid colors—a beautiful surprise.

The color device is amusing, intriguing, surprising, and highly educational. For instance, a wheel with alternating stripes of blue and yellow, when spun, appears as painted solid green. Black and white produce grey. Blue and deep yellow produce tan. Red and yellow produce orange. Red and green produce brown. Red and blue produce purple or violet. Red and white and blue produce orchid.

What is claimed as new is:

1. In an educational color toy device:
   an elongated base having an upright wall at each end thereof;
   a shaft extending through said walls, spanning the space therebetween, and having a crank at one end exterior to the wall at that end, whereby the shaft can be rotated manually;
   a plurality of cylindrical wheels, each wheel having alternating axially extending stripes of at least two different colors, on the curved surfaces thereof;
   said wheels each having a centered hole and the wheels being coaxially mounted, in side by side relation, for free individual rotation on said shaft between said upright walls; and
   means to prevent the shaft from moving in an axial direction;
   whereby the wheels may be individually spun by the finger of a user of the device to give the visual impression of a single solid color of each wheel, or all the wheels may be spun together by rapidly turning said crank to produce a multi-hued panorama of solid colors.

* * * * *